L. J. C. G. DEHAIS.
DETACHABLE RIM FOR CARRIAGE WHEELS.
APPLICATION FILED JUNE 20, 1908.
1,034,385.
Patented July 30, 1912.
2 SHEETS—SHEET 1.
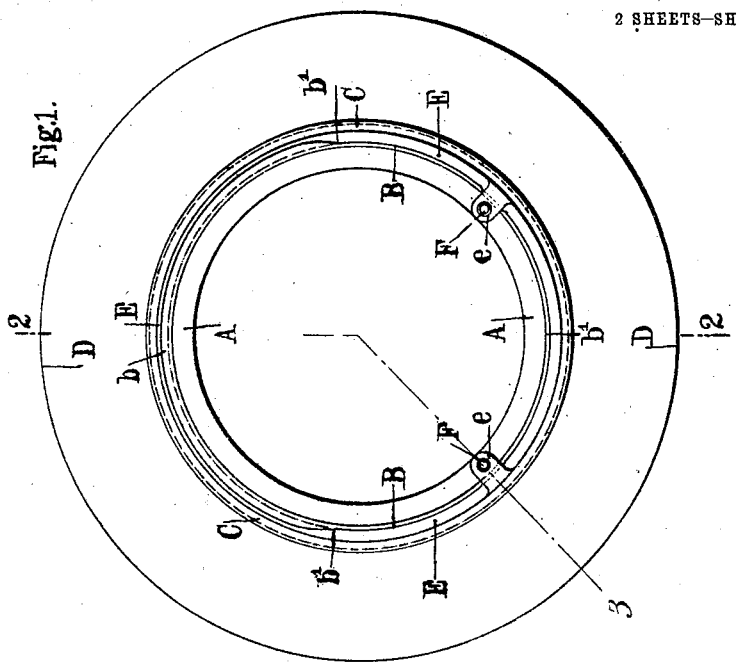
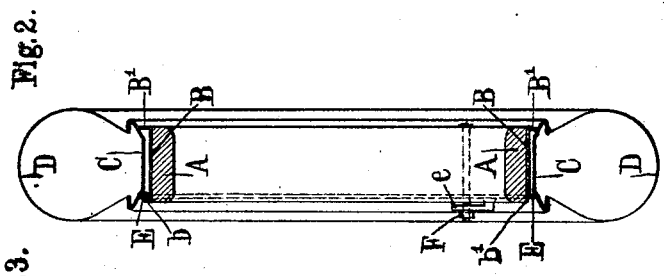
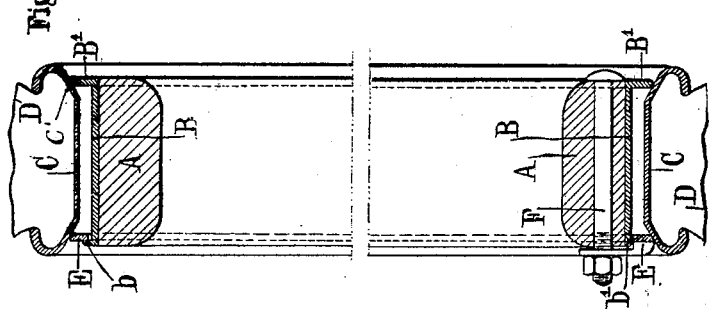
WITNESSES
INVENTOR
Louis Jean Claude Guillaume Dehais
BY
ATTORNEYS L. J. C. G. DEHAIS.
DETACHABLE RIM FOR CARRIAGE WHEELS.
APPLICATION FILED JUNE 20, 1908.

1,034,385.

Patented July 30, 1912.
2 SHEETS—SHEET 2.

WITNESSES

INVENTOR
Louis Jean Claude Guillaume Dehais
BY
Howson and Howson
ATTORNEYS

UNITED STATES PATENT OFFICE.

LOUIS JEAN CLAUDE GUILLAUME DEHAIS, OF PARIS, FRANCE.

DETACHABLE RIM FOR CARRIAGE-WHEELS.

1,034,385.   Specification of Letters Patent.   Patented July 30, 1912.

Application filed June 20, 1908. Serial No. 439,609.

*To all whom it may concern:*

Be it known that I, LOUIS JEAN CLAUDE GUILLAUME DEHAIS, a citizen of the French Republic, and residing at 9 Rue Chaptal, Paris, France, publicist, have invented a certain new and useful Detachable Rim for Carriage-Wheels, of which the following is a full, clear, and exact description.

This invention has reference to a detachable rim for carriage wheels, in which one of the flanges of the metal hoop of rectangular trough suction which is fitted to the rim proper or felly, is suitably cut away or reduced circularly, so as to facilitate the introduction of the keying or fastening devices for the movable metal rim which carries the pneumatic tire and to permit of expediting the mounting and detaching of this rim.

In the accompanying drawings, the invention is represented by way of example, in two different embodiments of the same.

Figure 4:
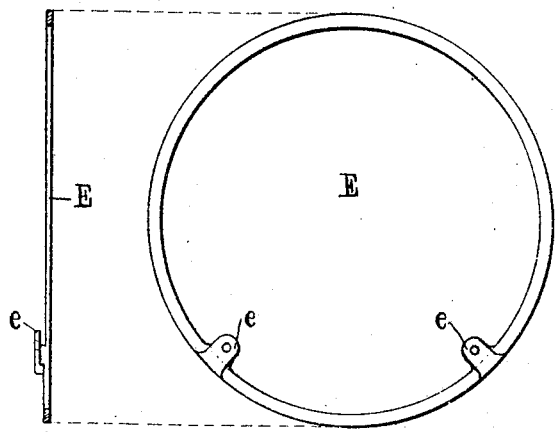
Figure 5:
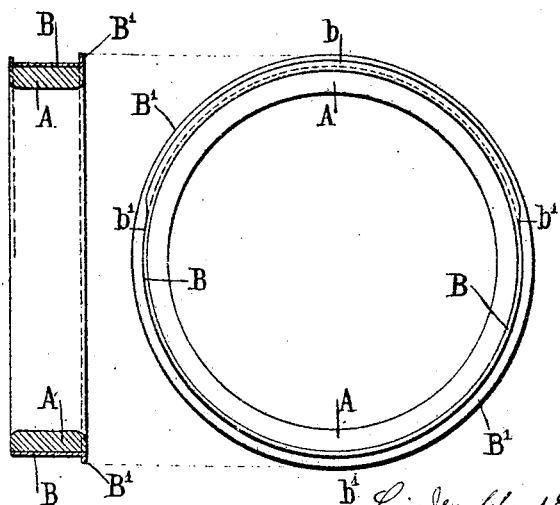

Figure 1 is a side elevation of a wheel rim showing my invention applied thereto in one form; Fig. 2 is a vertical section on line 2—2, Fig. 1; Fig. 3 is a vertical section partially broken away and on an enlarged scale on the line 2—3, Fig. 1; Fig. 4 shows in front and in vertical section the hoop which locks the rim carrying the pneumatic tire; Fig. 5 shows, in similar views, the hoop comprising the rim proper and secured to the felly.

Describing my invention as embodied in the form shown in Figs. 1 to 5, A designates the felly, made of wood for instance. B is the metal rim of rectangular trough shape in cross section secured on the felly and C is the movable metal rim. The pneumatic tire is indicated as a whole by D mounted in the usual manner upon the rim C. The wing or flange B' of the hoop B has throughout the same dimensions and particularly a uniform height while the wing or flange $b$ is of a height not only less than that of the wing B' but this height itself is reduced to zero at the whole of the part designated by $b'$. In other words the wing $b$ is cut away flush with the bottom of the trough for a part of the circumference as clearly shown in Fig. 5. To mount and lock the movable rim C with its pneumatic tire D, this rim C is slid upon the hoop B until its incline $c'$ bears against and upon the wing B'; then previously inclining it the fastening hoop or ring E is put in position, as shown in Figs. 1 to 3. Finally the bolts F are inserted into the felly A through the hoops or lugs $e$ integral with the hoop E, and these bolts are fixed by the aid of their nuts in such a way as to lock the hoop E against the incline $c$ of the rim C. The wheel is thus mounted complete.

I may make various modifications in the shapes, if desired, without departing from the spirit of the invention.

I claim as my invention—

A wheel comprising a felly, a channeled rim permanently secured thereto and having one side of the channel removed for substantially half the circumference of said rim, a demountable rim bearing on one side against the complete side of the permanent rim, in combination with a retaining ring inserted between the other side of said demountable rim and the incomplete side of the permanent rim and serving to support this side of the demountable rim, together with bolt means arranged on that part of the wheel diametrically opposite the incomplete portion of the permanent rim, serving to lock said retaining ring in position, substantially as described.

In testimony whereof I have signed my name to this specification, in the presence of two subscribing witnesses.

LOUIS JEAN CLAUDE GUILLAUME DEHAIS.

Witnesses:
   BENJAMIN BLOCHE,
   GUSTAVE DUMONT.